Inventor,
Joe A. Nuckolls,
by Sidney Greenberg
His Attorney.

United States Patent Office 3,344,311
Patented Sept. 26, 1967

3,344,311
COMPENSATING CONTROL CIRCUIT
Joe A. Nuckolls, Hendersonville, N.C., assignor to General Electric Company, a corporation of New York
Filed May 24, 1965, Ser. No. 458,353
17 Claims. (Cl. 315—199)

This application is a continuation-in-part of co-pending applications Ser. No. 223,480 filed Sept. 13, 1962, now Patent No. 3,249,807 and Ser. No. 451,508 filed on April 28, 1965, now Patent No. 3,317,789, both assigned to the same assignee as the present application.

The present invention relates to compensating control circuits for operating load devices, and more particularly concerns alternating current, phase controlled circuits which employ controlled rectifier switching devices as disclosed in the aforementioned co-pending applications and which incorporate one or more circuits for stabilizing and regulating the operation of the load devices, such as gaseous discharge lamps.

It is an object of the invention to provide an improved control circuit of the above type which incorporates means for effectively starting and operating various load devices and stabilizing their operation by compensating for variations in load voltage, line voltage, load impedance, and other operating conditions.

It is a particular object of the invention to provide in control circuits of the above type means for stabilizing the load current over wide load impedance variations and for effecting load current symmetry by correction of non-symmetrical current conditions caused by operation of the load and components of the control circuit.

It is another object of the invention to provide a compensating control circuit of the above type which is adapted for application to a wide variety of load devices, which compensates for undesired variations in a number of different types of operating conditions, either individually or in combination, and which is reliable in operation, compact in form and relatively inexpensive to manufacture.

Other objects and advantages will become apparent from the following description and the appended claims.

With the above objects in view, the present invention in one of its aspects relates to a control circuit for controlling the power applied to load means comprising, in combination, a source of alternating current, load means energized by the alternating current source, controlled rectifier means connected between the alternating current source and the load means, the controlled rectifier means being normally non-conductive to block current flow to the load means and having electrode control means to render it conductive, actuating means connected to the alternating current source and to the electrode control means for applying a control signal to the electrode means at a predetermined time in each alternating current cycle, and integrating circuit means connected between the actuating means and the alternating current source for stabilizing and providing symmetry of the load current.

In other embodiments, the control circuit of the invention incorporates one or more feedback circuits for compensating for variations in line and load voltage and other operating conditions. In particular embodiments in which the control circuit of the invention is especially useful, the load is constituted by gas discharge lamp, such as a mercury vapor lamp.

The invention will be better understood from the following description taken in conjunction with the accompanying drawings, in which.

Figure 1:
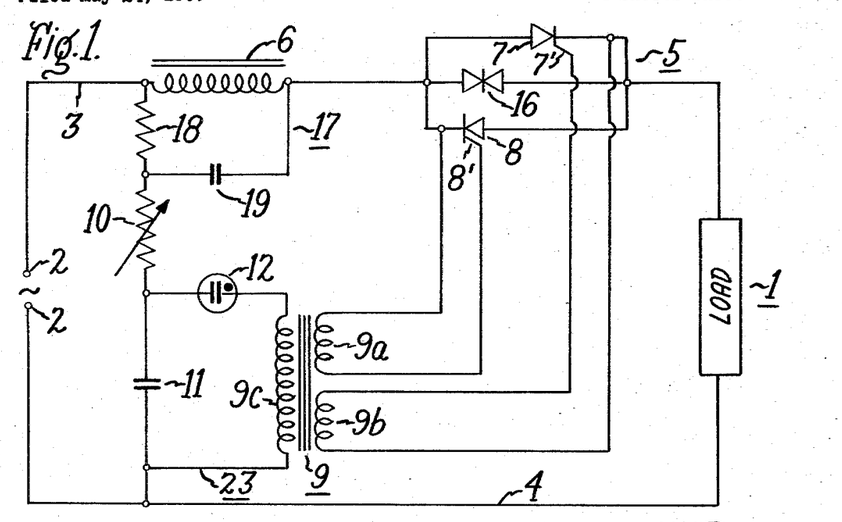
FIGURE 1 is a circuit diagram of an embodiment of a control circuit having a stabilization network in accordance with the invention.

Referring now to the drawing, and particularly to FIGURE 1, there is shown a phase controlled switching circuit for controlling the current and voltage applied to a load 1, such as a mercury vapor lamp or other variable impedance load, connected to terminals 2 of a source of alternating current, typically of 220 volts, by conductors 3 and 4. Ballast inductive reactance 6 is connected in series with lamp 1 to provide current limiting impedance, as conventional in discharge lamp circuits. Arranged in series with lamp 1 is a controlled rectifier circuit 5 which includes a paralleled pair of oppositely poled controlled rectifiers 7 and 8, which are typically silicon controlled rectifiers (SCR), having control (gate) electodes 7' and 8' by means of which the SCR's are rendered conductive for unidirectional flow of current when a signal impulse is applied to the respective control electrodes.

Control electrodes 7 and 8 are connected to secondary windings 9a, 9b of coupling transformer 9. Transformer 9, which serves to isolate the controlled rectifier circuit 5 from the impulse signal generating circuit, described below, is a pulse transformer which responds only to high frequency pulses and therefore only a single high frequency pulse is applied to the controlled rectifier circuit 5. This protects the control electrodes from any follow-through current from the alternating current supply 2 appearing in the signal generating circuit which could otherwise tend to cause over heating and early failure of the controlled rectifier circuit.

The signal generating or actuating circuit 23 comprises a variable resistance 10 in series with a charging capacitor 11 connected across terminals 2, thereby synchronizing the signal generating function with the source voltage. A discharge loop in actuating circuit 23 for discharging capacitor 11 includes transformer primary 9c and a voltage sensitive device 12, typically a neon glow lamp, which is a bilaterally conducting diode and is also referred to herein as a voltage sensitive symmetrical switch means, which becomes conductive only upon the application of a predetermined voltage thereto. Glow lamp 12 is connected to the source in parallel with capacitor 11 but is effectively connected in series discharge relation thereto, as shown, and with transformer primary 9c.

In the above described circuit arrangement, on each half cycle of the alternating current input, one of the controlled rectifiers 7 and 8 will have a positive anode and the other positive cathode. Therefore, a control signal applied to control electrodes 7' and 8' will place only one of the controlled rectifiers in a conduction mode on each half cycle. A delay in the point in the alternating current input cycle at which the control signal impulse is applied to render the rectifier conductive is known as phase control.

As more fully described in the aforementioned copending applications, the disclosures of which are incorporated herein by reference, when glow lamp 12 becomes conductive as a result of voltage buildup on capacitor 11, capacitor 11 partially discharges and a signal pulse is applied to the transformer primary 9c which induces a curent pulse, of a particular duration and at a particular time in the half cycle. The controlled rectifier 7 or 8 which has an anode positive with respect to its cathode will then be triggered into conduction by the pulse current applied to control electrodes 7', 8' and the voltage which has built up across the rectifier falls substantially to zero. The controlled rectifier 7 or 8 then permits current to flow building up the voltage, and consequently the power, applied to the load, until the source voltage again falls to zero at half cycle. On the next half cycle as the anode voltage becomes negative, the controlled rectifier 7 or 8 which was conductive becomes non-conductive and no power is transferred to the load until the signal generating circuit fires the ohter controlled rectifier. The time in the half cycle at which the rectifier is gated is adjustable by the level of resistance 10.

For the purpose of protecting the rectifier circuit 5 from transient voltages, a thyrector 16, or double zener diode device, may be connected in parallel with the rectifiers, as shown.

In accordance with the present invention, the control circuit described is provided with an integrating network 17 comprising series connected resistor 18 and capacitor 19 connected as shown across reactor 6, and variable resistor 10 is connected to network 17 at the junction of resistor 18 and capacitor 19. Integrating network 17 is thus driven by the reactor voltage to effect a current feedback voltage which is added to the source voltage, and this total voltage is applied to energize actuating or signal generating circuit 23. The feedback voltage produced in integrating network 17 is a function of the reactor current on the last half cycle and the total voltage applied to actuating circuit 23 by operation of integrating network 17 thus serves to stabilize the load current over wide variations in load impedance. Such stabilization is particularly useful, for example, in providing effective starting and operation of mercury discharge lamps, which exhibit radical changes in impedance between the starting period and the attainment of full operational wattage, e.g., 400 watts.

By way of example, the control circuit operating from a 220 volt A-C source and using a capacitor 19 of .047 microfarad and a resistance 18 of 180K ohms typically provides a firing angle of 52° prior to lamp ignition, 90° immediately after ignition, and adjusts back to 65° as the lamp warms up to 400 watts. This provides a starting (short circuit) current of about 5.2 amperes and an operating current of 3.2 amperes.

In addition to thus stabilizing the load current, integrating network 17 also serves to force current symmetry. During the starting interval, the lamp load rectifies, causing a non-symmetrical current to flow from the line. This factor in turn causes problems due to saturation of reactor 6. Other factors, e.g., non-symmetrical conduction by the silicon controlled rectifiers in switching circuit 5, may also contribute to such difficulties. Integrating network 17 added to the circuit across reactor 6 senses the non-symmetrical current flowing through reactor 6 on the previous half cycle as a result of these non-linear mechanisms, and forces a firing angle correction on the next half-cycle and tends to correct for the previous half-cycle variation.

While the integrating network 17 is shown connected across the reactor 6 to effect load current feedback along with current phase relationships, it may be desirable to connect it across other circuit components such as the load to provide the desired type of feedback.

In a typical control circuit utilizing a 60 cycle source, resistor 18 and capacitor 19 will have such values that their product will be approximately 8 milliseconds in order to obtain the desired integrating effect. The magnitude of the individual components can be selected to adapt to the overall circuitry impedance levels.

While the load 1 has been described specifically in reference to a mercury vapor lamp, it will be understood that the described stabilized control circuit may be employed in conjunction with various other types of lamps or lighting devices or other loads such as motors, heaters, electric welders, etc., where problems especially in variations in load current, impedance, and current symmetry are involved.

Figure 2:
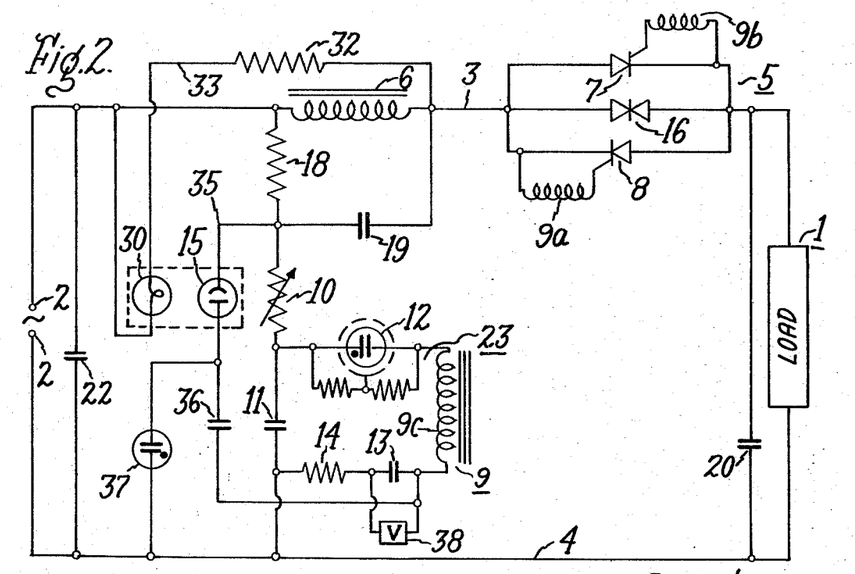
FIGURE 2 is a circuit diagram of another embodiment of the invention including a constant current feedback for controlling and stabilizing the power applied to a load.

FIGURE 2 is a circuit diagram of a stabilized control circuit which also incorporates a current feedback system. This circuit includes SCR switching circuit 5 and integrating network 17 as described above in connection with FIGURE 1. Actuating circuit 23 comprises, in addition to the components shown in FIGURE 1, a second charging capacitor 13 and current limiting resistor 14 connected in series with primary winding 9c in the discharge loop circuit. The FIGURE 2 system comprises a feedback circuit 33 connected across reactor 6 and including resistor 32 and incandescent lamp 30. Employed in conjunction with lamp 30 is a photosensitive circuit 35 including photoconductor 15, such as a cadmium sulfide cell, arranged adjacent lamp 30, and capacitor 36. Circuit 35 is connected at one end to integrating network 17 at the junction of capacitor 19 and resistor 18, and at the other end in series with capacitor 13. The feedback system provides lamp load wattage regulation compensating for line voltage variations and to a large degree for lamp voltage variations, and essentially effects constant current.

In operation of the feedback circuit described, a residual charge or voltage is left on capacitor 13 which series aids the breakdown of glow lamp 12 on the next half-cycle which in turn tends to advance the firing angle supplying more power to the load. This voltage is discharged polarity reversed and recharged as the resistance of the feedback photoconductor 15 is changed from a very high resistance to a low resistance by action of the small incandescent lamp 30 brightening as a function of the voltage drop across reactor 6. The voltage buildup across capacitor 11 is constant for a given setting of resistor 10, but the voltage change across capacitor 13 varies according to the resistance level of photoconductor 15. Thus, in the event current to load 1 drops, incandescent lamp 30 becomes dimmer, with the result that the resistance of photoconductor 15 increases and consequently the rate of voltage change across capacitor 13 relative to capacitor 11 is controlled by photoconductor 15 so that the firing angle of the controlled rectifier circuit 5 is advanced, delivering more power to lamp 1 and thus maintaining its illuminating level. As the resistance of photoconductor 15 decreases in response to an increase in light from incandescent lamp 30, less power will be delivered to lamp 1 since the firing angle of the controlled rectifier circuit is delayed. Thus the power to the load is maintained constant light output may be achieved.

While connection of photosensitive circuit 35 to integrating network 17 is preferable as shown in FIGURE 2 for the reason that this places the feedback in the same phase relationship, etc., as the basic trigger circuit driving voltage, circuit 35 may alternatively be connected directly to conductor 3 if desired.

Feedback series capacitor 36 serves to limit the feedback current and avoids the risk of overheating of photoconductor 15. In addition, capacitor 36 provides a leading-charging current, and as a result the feedback system operates more effectively and provides greater angular control of the firing of the switching circuit.

Where the starting current of the load is substantially higher than its operating current, as is the case with mercury lamps, it is desirable to connect a neon glow lamp 37 or other voltage sensitive switch means across capacitor 36 and capacitor 13 to effect a feedback lock-out or limiting action during the load starting interval, which then drops out to permit full regulation sensitivity during load operation. When the lamp load impedance is low, i.e., at starting, the current is high and incandescent lamp 30 is bright, and consequently the resistance of photoconductor 15 is low. Therefore, the voltage across glow lamp 37 is above its ionizing voltage and its breakdown clamps the voltage in circuit 35, thereby limiting the potential high feedback to allow 5 amperes lamp starting current to flow. As lamp 1 warms up to approximately 300 watts and its impedance rises, the high feedback diminishes and the voltage at the junction of capacitor 19 and resistor 18 falls, and glow lamp 37 de-ionizes, dropping out of the circuit.

A voltage limiting device 38 such as a varistor or double zener diode is connected across capacitor 13 to clamp the capacitor voltage and thereby limit the feedback voltage and stabilize the circuit over a broad control range.

As shown in FIGURE 2, neon glow lamp 12 is advantageously provided with an electrostatic shield connected to a shunt resistance, as more fully described in the aforementioned co-pending application Serial No. 451,508.

Figure 3:
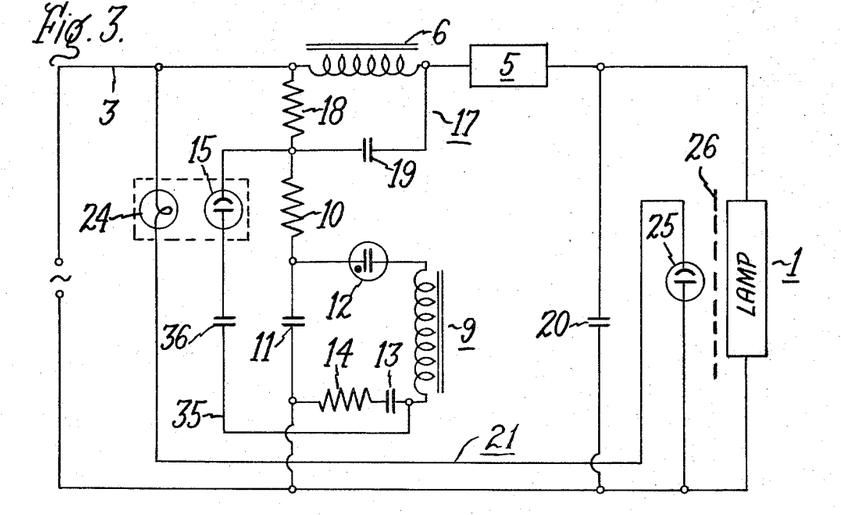
FIGURE 3 is a circuit diagram similar to that of FIGURE 1 embodying a constant light feedback circuit.

FIGURE 3 is a circuit diagram of a constant light feedback arrangement which may be employed in accordance with the invention. In the control circuit shown, having components as described above and with the same numerals designating like components, there is incorporated a feedback circuit 21 including photoconductor 25 placed to receive light from lamp 1, and an incandescent lamp 24 placed to project light on photoconductor 15, the feedback circuit being connected between line conductors 3 and 4. In the operation of this circuit, in the event the light output from lamp 1 drops below a desired level, the resistance of photoconductor 25 increases, resulting in a corresponding dimming of incandescent lamp 24. As the resistance of photoconductor 15 increases in response to a decrease in light from incandescent lamp 24, the charge rate of capacitor 13 through photoconductor 15 is lowered and the firing angle of SCR circuit 5 is advanced, delivering more power to lamp 1 and thus maintaining its desired illuminating level. In the event the light output of lamp 1 becomes higher than the desired level, the reverse action takes place in feedback circuit 21, resulting in less power being delivered to lamp 1 since the firing angle of the SCR circuit 5 is delayed. Thus a constant light output of lamp 1 may be achieved.

If desired, an adjustable screen 26 may be interposed between lamp 1 and photoconductor 25 to adjust the level of light reaching the latter from lamp 1.

Figure 4:
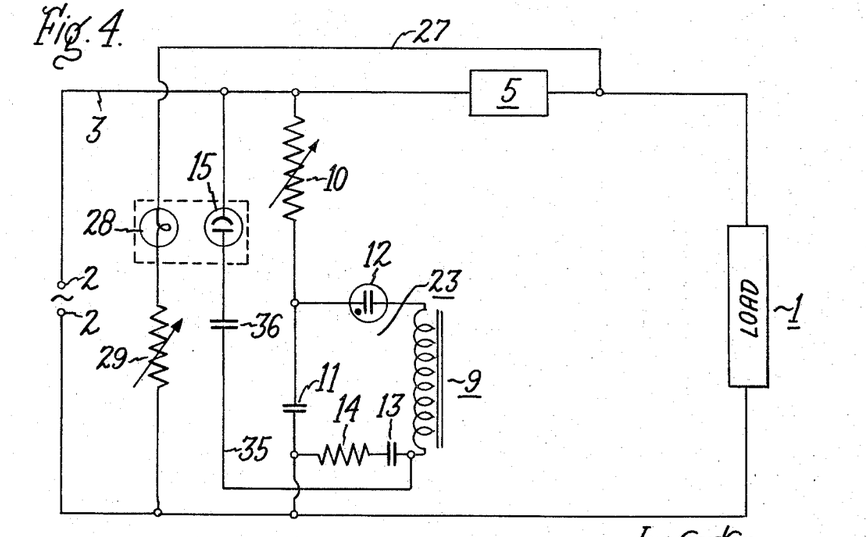
FIGURES 4, 5 and 6 are circuit diagrams showing different feedback circuits for controlling the operation of a load device.
Figure 5:
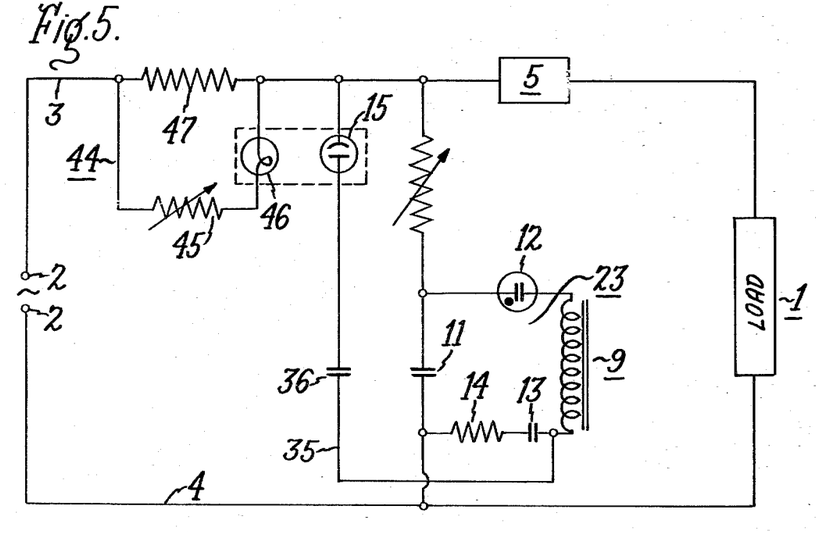
Figure 6:
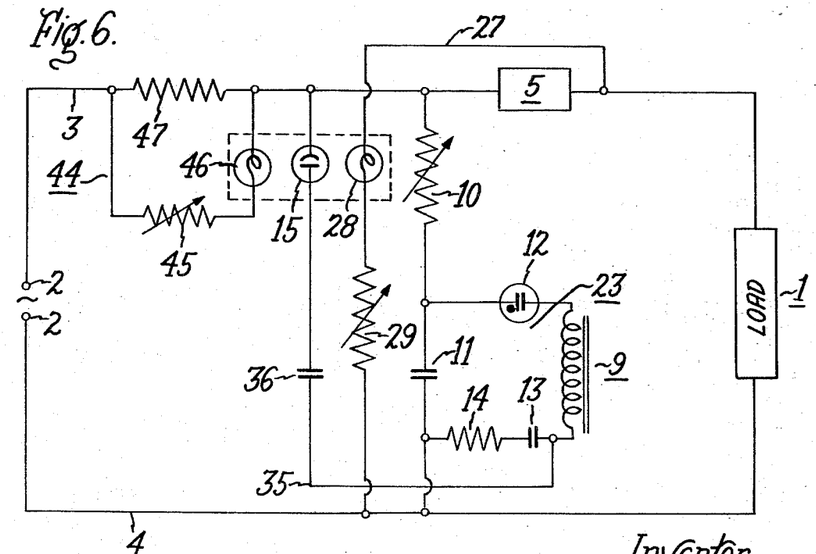

FIGURES 4, 5 and 6 show other embodiments of feedback circuits which may be employed in the control circuit. In FIGURE 4, feedback circuit 27 including incandescent lamp 28 and adjustable resistor 29 is connected between conductors 3 and 4 as shown and thus functions in response to variations in the output voltage across the load. As will be evident, changes in the light emanating from lamp 28 due to output voltage variations cause changes in resistance of photoconductor 15 to affect the operation of the control circuit, and thus the power applied to lamp 1, in the manner previously described.

FIGURE 5 shows another embodiment wherein a load current feedback circuit 44 including adjustable resistor 45 and incandescent lamp 46 is connected across a shunt 47 in the line. Shunt 47 may be constituted by a resistance or linear reactance or any linear voltage-dropping medium. The output of lamp 46 responds to variations in current through the line to load 1 as a result of such connection and causes compensating changes in power delivered to lamp 1 by means of photoconductor circuit 35, actuating circuit 23 and SCR circuit 5 as previously described. As will be recognized, a load current feedback circuit similar to feedback circuit 44 is constituted by feedback circuit 33 shown in FIGURE 2, wherein the latter is connected across reactor 6 representing shunt 47 in this case.

FIGURE 6 is a circuit showing an embodiment in which the output voltage feedback of FIGURE 4 and the load current feedback of FIGURE 5 are combined. In this arrangement photoconductor 15 is placed to receive the light from both incandescent lamps 28 and 46 and serves to integrate the variations produced in both by their respective functions as described above. As previously indicated, an adjustable screen such as shown in FIGURE 3 may be placed between the photoconductor 15 and the incandescent lamps associated therewith in any of the above embodiments, if desired.

Figure 7:
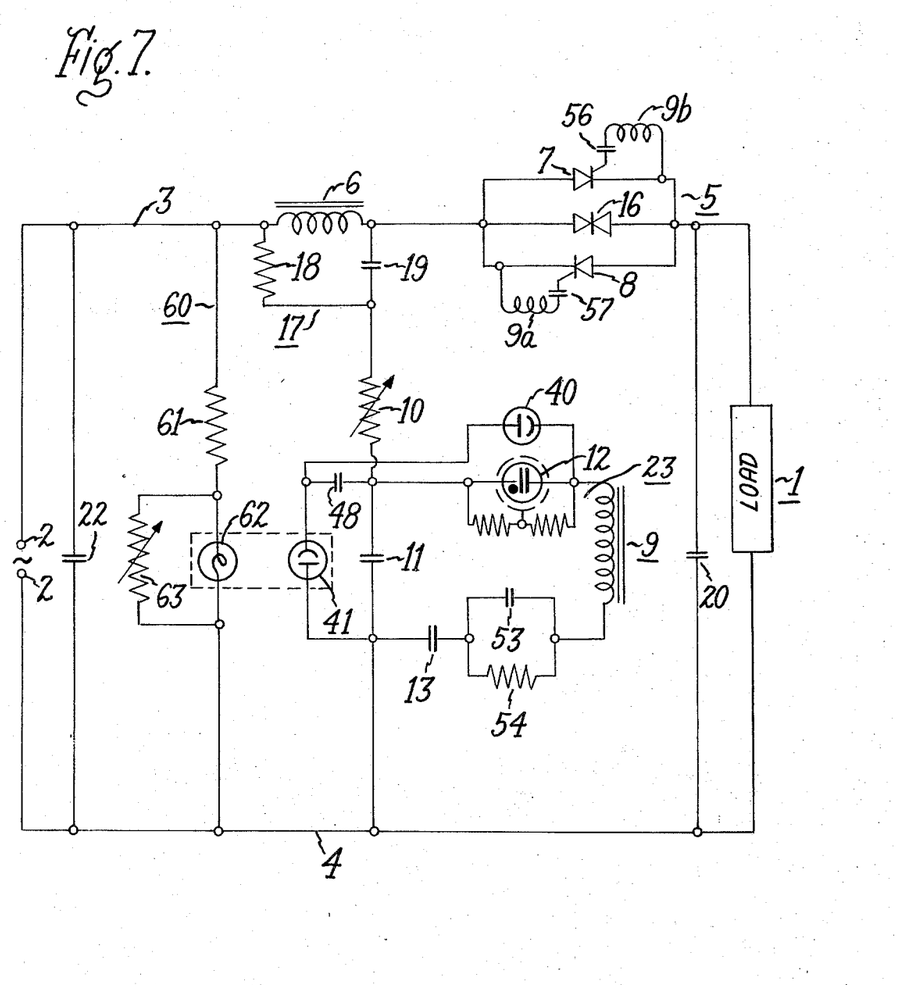
FIGURE 7 is a circuit diagram showing a modified photo-electric control circuit embodied in a circuit of the invention.

FIGURE 7 is a circuit diagram of a stabilized control circuit which incorporates a somewhat different arrangement of the photoconductor feedback circuit, and other modifications. In this embodiment feedback circuit 60 connected across the supply lines 3 and 4 is responsive to input voltage variations and includes resistance 61 in series with incandescent lamp 62, the latter having variable resistor 63 connected in shunt therewith. Arranged adjacent lamp 62 is photoconductor 41 which in series with capacitor 48 is placed in parallel with actuating circuit 23. An auxiliary photosensitive control circuit comprising photoconductor 40 connected across capacitor 48 and neon glow lamp 12 serves to automatically turn load 1 on and off at a desired ambient light level.

In the system shown, fixed series resistance 61 is selected to effect the maximum desired feedback at the lowest input alternating current voltage. Variable resistor 63 across lamp 62 is a low wattage resistance and is adjustable to back down the feedback operating point from the set maximum level. Resistor 63 also serves to permit a change in the slope of the feedback characteristic, which may be desirable in certain cases. By way of illustration, in a typical circuit resistor 61 has a value of 20K ohms and 10 watts, while resistor 63 is 10K ohms and 1 watt. In pre-setting the system for a particular load and other conditions, the input voltage is set at the midpoint of the expected voltage range, resistor 63 is then adjusted to a short circuit condition, and resistor 61 is selected to provide the correct load wattage. The resistance of resistor 63 is then increased until the load wattage just begins to decrease. In the operation of this system, if the line voltage increases, the current through incandescent lamp 62 increases, brightening lamp 62 and causing photoconductors 41 to decrease in resistance and thereby shunting more of the available charging current from capacitor 11. This slows the voltage buildup across capacitor 11, hence delaying the firing of the SCR circuit 5 and regulating the power delivered to lamp 1 or other load.

The photoelectric control for turning the system on and off is achieved by exposing photoconductor 40 to the ambient light. As the ambient light level increases, the photocell resistance decreases allowing the current to pass around neon glow lamp 12, keeping the latter from reaching a breakdown voltage level and conducting, and thus preventing the operation of the triggering or signal generating circuit 23.

In the arrangement shown, capacitor 48 serves both as a symmetry forcing component during the photoelectric current-on and current-off functions and as a means for providing a more stabilized footcandle level at which such switching occurs over the variation in line voltage designed for.

A damping resistor 54 is preferably placed in series with capacitor 13 to ensure a surge or damped trigger pulse, so as to provide a discharge without oscillatory tendencies or multiple pulsing. To provide for such overdamping of the body of the trigger pulse while allowing the fast wave front to be passed unaltered, a small capacitor 53 is placed in shunt with resistor 54. By way of illustration, in a typical circuit resistor 54 is 33,000 ohms and capacitor 53 is .01 microfarad.

In SCR circuit 5, small capacitors 56 and 57 are preferably placed in series with the control electrodes (gates) of the respective controlled rectifiers 7 and 8, in order to avoid undesirable self-triggering in the use of certain types of silicon controlled rectifiers.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmertical switch means connected across said capacitance, and integrating circuit means connected between said load means and said actuating means for stabilizing the load current and for providing load current symmetry.

2. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected in series with said load means, and integrating circuit means connected between said impedance means and said actuating means for stabilizing the load current and for providing load current symmetry.

3. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected in series with said load means, and integrating circuit means connected between said impedance means and said actuating means for stabilizing the load current and for providing load current symmetry, said integrating circuit means being connected across said impedance means and comprising a resistor and a capacitor in series, said actuating means being connected to the junction of said resistor and said capacitor.

4. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected in series with said load means, integrating circuit means connected between said impedance means and said actuating means for stabilizing the load current and for providing load current symmetry, current sensitive means connected across said impedance means for detecting variations in voltage of said source and said load means, and means responsive to said current sensitive means and connected to said actuating means for controlling the operation thereof in response to said current sensitive means.

5. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected in series with said load means, integrating circuit means connected between said impedance means and said actuating means for stabilizing the load current and for providing load current symmetry, current sensitive means comprises light producing means and photosensitive means responsive to said light producing means and connected to said actuating means for controlling the operation thereof in response to the light output of said light producing means.

6. A circuit for controlling the power applied to load means comprising, in combination, a source of alternating current, load means connected by a pair of line conductors to said alternating current source so as to be energized thereby, controlled rectifier means connected between said alternating current source and said load means, said controlled rectifier means being normally non-conductive to block current flow to the load means and having electrode control means to render it conductive, actuating means connected to said alternating current source and to said electrode control means for applying a control signal to said electrode control means at a predetermined time in each alternating current cycle, said actuating means including a resistance and capacitance connected together in series, and voltage sensitive symmetrical switch means connected across said capacitance, impedance means connected in series with said load means, integrating circuit means connected between said impedance means and said actuating means for stabilizing the load current and providing load current symmetry, feedback circuit means comprising current sensitive means connected between said line conductors for detecting voltage variations across said conductors, and means responsive to said current sensitive means and connected to said actuating means for controlling the operation thereof in response to said current sensitive means.

7. A circuit for controlling the power applied to load means comprising, in combination, a source of alternating current, load means connected by a pair of line conductors to said alternating current source so as to be energized thereby, controlled rectifier means connected between said alternating current source and said load means, said controlled rectifier means being normally non-conducitve to block current flow to the load means and having electrode control means to render it conductive, actuating means connected to said alternating current source and to said electrode means for applying a control signal to said electrode control means at a predetermined time in each alternating current cycle, said actuating means including a resistance and capacitance connected together in series, and voltage sensitive symmetrical switch means connected across said capacitance, impedance means connected in series with said load means, integrating circuit means connected between said impedance means and said actuating means for stabilizing the load current and providing load current symmetry, feedback circuit means comprising light producing means connected between said line conductors for detecting voltage variations across said conductors, and photosensitive means responsive to said light producing means and connected to said actuating means for controlling the operation thereof in response to the light output of said light producing means.

8. A circuit for controlling the power applied to load means comprising, in combination, a source of alternating current, load means connected by a pair of line conductors to said alternating current source so as to be energized thereby, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected in series with said load means, first feedback circuit means comprising light producing means connected between said line conductors for detecting voltage variations across said conductors, second feedback circuit means comprising second light producing means connected across said impedance means for detecting variations in current passing to the load, and photosensitive means responsive to the light output of both said first and second light producing means and connected to said actuating means for controlling the operation thereof in response to both said light producing means.

9. A circuit for controlling power applied to lamp means comprising, in combination, a source of alternating current, lamp means connected by a pair of line conductors to said alternating current source so as to be energized by the same, controlled rectifier means connected between said alternating current source and said lamp means, said controlled rectifier means being normally non-conductive to block current flow to said lamp means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, feedback circuit means connected between said line conductors and comprising current sensitive light producing means and a first photosensitive means responsive to the light output of said lamp means, and second photosensitive means connected to said actuating means and responsive to the light output of said light producing means for controlling the operation of said actuating means.

10. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected in series with said load means, integrating circuit means connected between said impedance means and said actuating means for stabilizing the load current and for providing load current symmetry, and feedback circuit means connected to said alternating current source and comprising light producing means responsive in light output to variations in load conditions, photosensitive means responsive to said light producing means, and a capacitor in series with said photosensitive means, said photosensitive means and said capacitor being connected to said actuating means for controlling the latter in response to the light output of said light producing means.

11. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, impedance means connected in series with said load means, integrating circuit means connected between said impedance means and said actuating means for stabilizing the load current and for providing load current symmetry, and feedback circuit means connected to said alternating current source and comprising light producing means responsive in light output to variations in load conditions, photosensitive means responsive to said light producing means, a capacitor in series with said photosensitive means, said photosensitive means and said capacitor being connected to said actuating means for controlling the latter in response to said light producing means, and a voltage sensitive switch connected across said capacitor for limiting the voltage across the same.

12. A circuit for controlling the power applied to a load means comprising, in combination, a source of alternating current, load means connected by a pair of line conductors to said alternating current source so as to be energized thereby, controlled rectifier means connected between said load means and said alternating current source, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a first capacitance connected together in series, voltage sensitive symmetrical switch means connected across said first capacitance, and a second capacitance and a pulse transformer in series with said switch means, and feedback circuit means connected to said alternating current source and comprising light producing means responsive in light output to variations in load conditions, photosensitive means responsive to said light producing means, and a capacitor in series with said photosensitive means, said photosensitive means and said capacitor being connected in series with said second capacitance for controlling said actuating means in response to said light producing means.

13. A circuit for controlling the power applied to a load means comprising, in combination, a source of alternating current, load means connected by a pair of line conductors to said alternating current source so as to be energized thereby, controlled rectifier means connected between said load means and said alternating current source, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a first capacitance connected together in series, voltage sensitive symmetrical switch means connected across said first capacitance, and a second capacitance and a pulse transformer in series with said switch means, impedance means connected in series with said load means, integrating circuit means connected between said impedance means and said actuating means for stabilizing the load current and providing load current symmetry, and feedback circuit means connected to said alternating current source and comprising light producing means responsive in light output to variations in load conditions, photosensitive means responsive to said light producing means connected to said integrating circuit means and a capacitor in series with said photosensitive means, said photosensitive means and said capacitor being connected in series with said second capacitance for controlling said actuating means in response to said light producing means.

14. A circuit for controlling the power applied to a load means comprising, in combination a source of alternating current, load means energized by said alternating current source, controlled rectifier means connected between said load means and said alternating current source, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a first capacitance connected together in series, voltage sensitive symmetrical switch means connected across said first capacitance, and a second capacitance and a pulse transformer in series with said switch means, feedback circuit means connected to said alternating current source and comprising light producing means responsive in light output to variations in load conditions, a photoelectric control circuit comprising a photosensitive means and a capacitor in series therewith, said photoelectric control circuit being in series relation with said second capacitance, said photosensitive means being responsive to said light producing means for determining the rate of charge of said second capacitance and thereby controlling the operation of said actuating means, a voltage sensitive switch connected across said capacitor for limiting the voltage across the same, and a voltage limiting device connected across said second capacitance for limiting the voltage across the same.

15. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, feedback circuit means connected to said alternating current source and comprising light producing means responsive in light output to variations in load conditions, a photoelectric control circuit comprising photosensitive means responsive to said light producing means, and a capacitor in series with said photosensitive means, said photoelectric control circuit being connected across said capacitance for controlling said actuating means in response to the light output of said light producing means, impedance means connected in series with said load means, and integrating circuit means connected between said impedance means and said actuating means for stabilizing the load current and providing load current symmetry.

16. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, feedback circuit means connected to said alternating current source and comprising light producing means responsive in light output to variations in load conditions, a photoelectric control circuit comprising first photosensitive means responsive to said light producing means, and a capacitor in series with said first photosensitive means, said photoelectric control circuit being connected across said capacitance for controlling said actuating means in response to the light output of said light producing means, impedance means connected in series with said load means, integrating circuit means connected between said impedance means and said actuating means for stabilizing the load current and providing load current symmetry, second photosensitive means connected across said voltage sensitive symmetrical switch means and said capacitor for turning said actuating means on and off in response to ambient light conditions.

17. A circuit for controlling the power applied to load means comprising, in combination, a source of alternating current, load means energized by said alternating current source, controlled rectifier means connected between said alternating current source and said load means, said controlled rectifier means being normally non-conductive to block current flow to said load means and having electrode control means to render it conductive, actuating means connected to said alternating current source and to said electrode control means for applying a control signal to said electrode control means at a predetermined time in each alternating current cycle, said actuating means including a resistance and a capacitance connected together in series, and voltage sensitive symmetrical switch means connected across said capacitance, feedback circuit means connected to said alternating current source and comprising light producing means responsive in light output to variations in load conditions, a photoelectric control circuit comprising first photosensitive means responsive to said light producing means, and a capacitor in series with said first photosensitive means, said photoelectric control circuit being connected across said capacitance for controlling said actuating means in response to the light output of said light producing means, impedance means connected in series with said load means, integrating circuit means connected between said impedance means and said actuating means for stabilizing the load current and providing load current symmetry, second photosensitive means connected across said voltage sensitive symmetrical switch means and said capacitor for turning said actuating means on and off in response to ambient light conditions, and means in series with said second capacitance for overdamping the body of the trigger pulse produced by said actuating means while leaving the wave front thereof unaltered.

No references cited.

JOHN W. HUCKERT, *Primary Examiner.*

R. F. POLISSACK, *Assistant Examiner.*